UNITED STATES PATENT OFFICE.

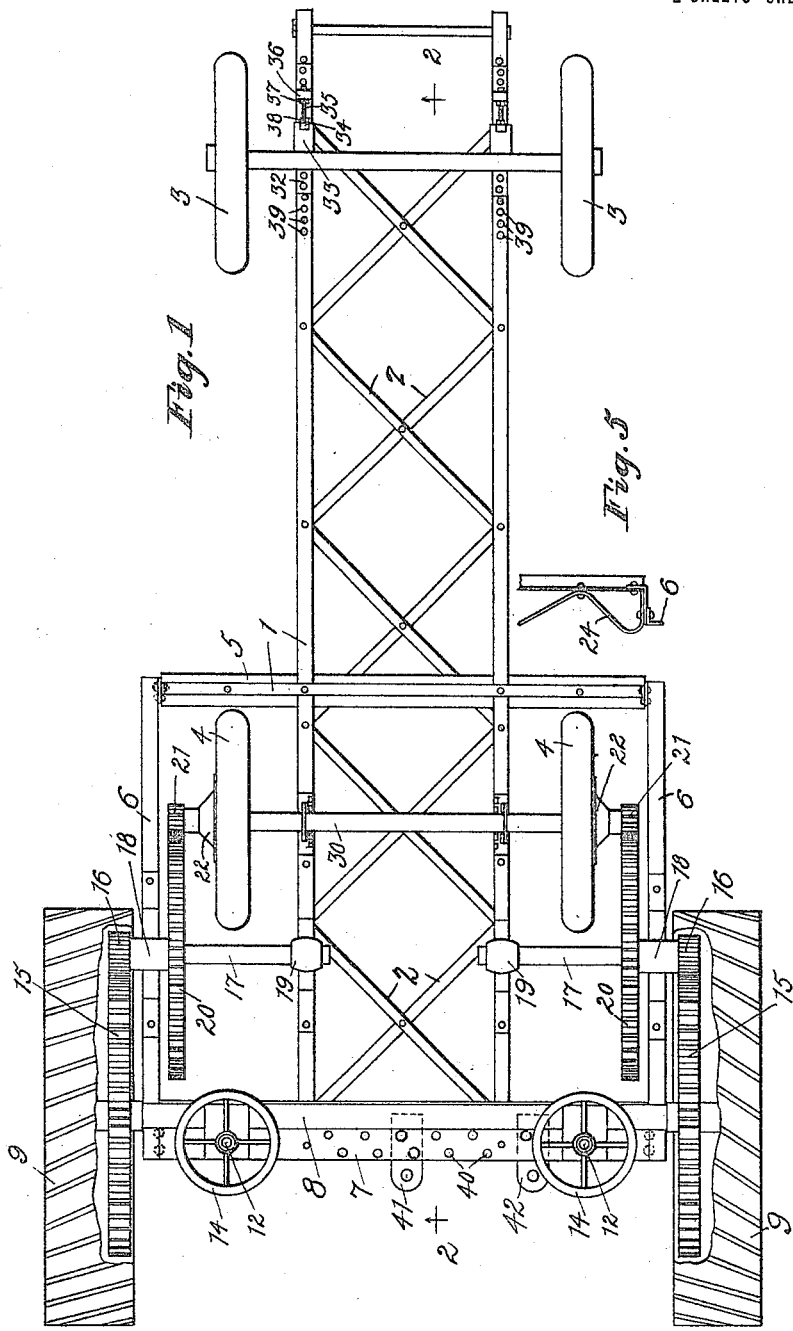

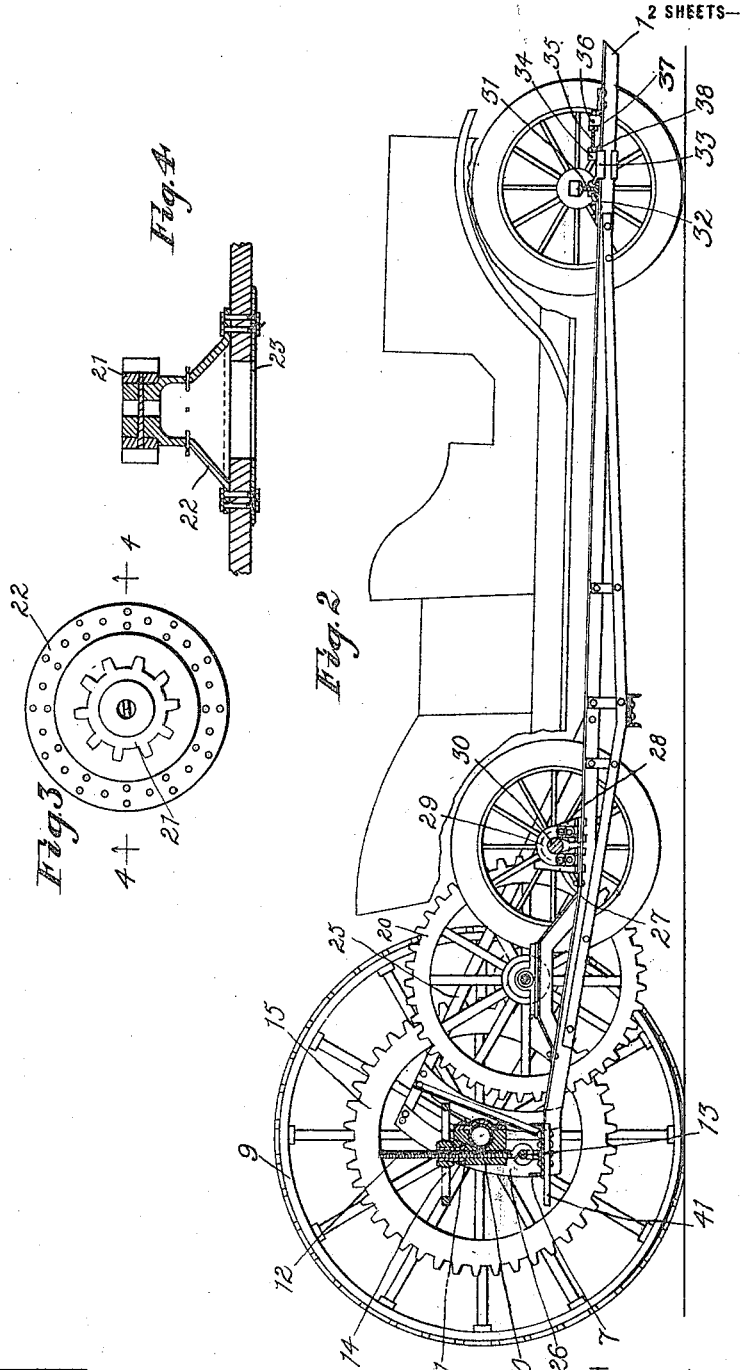

WALTER H. ZIMMERMAN, OF CHICAGO, ILLINOIS, ASSIGNOR, BY MESNE ASSIGNMENTS, TO AUTO TRACTOR COMPANY, OF NILES, MICHIGAN, A CORPORATION OF MICHIGAN.

AUTOMOBILE TRACTOR.

1,234,437. Specification of Letters Patent. Patented July 24, 1917.

Application filed August 14, 1911. Serial No. 643,826.

*To all whom it may concern:*

Be it known that I, WALTER H. ZIMMERMAN, a citizen of the United States, residing at Chicago, in the county of Cook and State of Illinois, have invented a certain new and Improved Automobile Tractor, of which the following is a full, clear, concise, and exact description, reference being had to the accompanying drawings, forming a part of this specification.

My invention has for its object to enlarge the usefulness of automobiles generally, by providing an attachment which, when secured to an automobile, so changes the relation of tractive effort and speed that the combined mechanism may be used to advantage for various purposes for which traction engines are now commonly employed.

For example, the mechanism may be employed to prepare the ground for crops, as it is adapted to draw the plows and cultivators employed for this purpose.

The mechanism may also be employed to draw the crops from the fields in wagons if desired, and the crops may similarly be drawn by the mechanism to market, much more effectively than by means of horses.

Thus, my tractor mechanism, when used with an ordinary automobile, will perform many operations on the farm for which a large number of horses are required, and materially reduces the expense of operating a farm, since, by its use the number of horses and men required to operate the farm may be much less than without the use of the tractor.

Furthermore, all of the results pointed out are secured without, in any way, interfering with the use of the automobile for its ordinary purposes.

The further object of my invention is to provide a mechanism as described above which can be attached to automobiles of different types, and for readily disconnecting and separating such mechanism from the automobile to which it may be attached.

The tractor mechanism itself is simple and of relatively low cost, and thus has the marked advantage of affording a farmer owning an automobile not only a pleasure vehicle, but also a high-power tractor machine at a comparatively small outlay over the cost of the automobile itself.

The several drawings illustrating my invention are as follows:—

Figure 1 shows in plan view a tractor mechanism complete.

Fig. 2 is a vertical sectional view of the parts shown in Fig. 1, taken along the line 2—2. In this figure the wheels of the automobile are shown in place in the tractor mechanism, and the outline of the automobile body is shown to indicate the relative position of the parts.

Fig. 3 is an end view of a gear support, adapted to be secured to a rear wheel of the automobile, to communicate with the driving mechanism of the tractor.

Fig. 4 is a sectional view of the parts shown in Fig. 3, taken along line 4—4.

Fig. 5 is an end elevation view of a portion of the structure shown in Fig. 1.

Similar numerals refer to similar parts throughout the several views.

As shown in Figs. 1 and 2 the tractor mechanism is supported by a frame comprising two main longitudinal members 1—1 securely held in proper relative position by the brace bars 2—2 at such a distance apart that they are well within the wheels 3, 3 and 4, 4 of the automobile when connected therewith, for all conditions of operation.

The longitudinal members 1, 1 have secured thereto just in front of the rear wheels 4, 4 of the automobile a transverse channel bar 5 extending beyond the wheels of the automobile to support the forward ends of the longitudinal members 6, 6, the rear ends of which are secured to the ends of a second transverse channel bar 7, to which are also secured the rear ends of the members 1, 1.

The frame work thus formed, it will be understood, is constructed entirely of structural shapes, such as angle bars, channel bars, or any other convenient shapes which are formed from wrought iron or steel by rolling.

The rear end of the tractor frame is supported by the axle 8 by means of broad-faced wheels 9, 9 of comparatively large diameter, to secure a maximum tractive force and prevent the weight of the machine from causing the wheels to sink to any great depth into the ground over which the machine is propelled.

The axle 8 has rigidly secured thereto two metal blocks 10, each of which engages the flange of a flanged sleeve 11 to permit rotation of such sleeve relatively to the block without, however, permitting motion of the sleeve in any other direction relatively to said block. Each sleeve 10 is internally threaded to engage the threads formed on an eye-bolt 12, the eye of which engages a loop or U bolt 13, the ends of which are secured to the channel bar 7. Each sleeve 11 has rigidly secured thereto a hand-wheel 14, and thus by turning the hand-wheels the rear end of the tractor frame may be raised or lowered as desired.

Thus the axle 8, which preferably consists of a pipe or tube, is rigidly secured to the rear end of the frame-work of the tractor so that rotation of such axle is prevented, and the driving wheels 9, 9 carried by the ends of such axle are loosely mounted thereon so that they may rotate freely. Each of the driving wheels 9, 9 has rigidly secured thereto a comparatively large gear 15 meshing with a pinion 16 secured to the outer end of a jack shaft 17. Each jack-shaft is supported from the tractor frame at its outer and inner ends respectively by bearings 18 and 19, and between these bearings is rigidly secured thereto a gear 20 meshing with a pinion 21 carried by one of the rear wheels 4 of the automobile. The pinion 21 is rigidly secured to a supporting member 22 bolted to the spokes of the corresponding rear wheel 4 of the automobile, as indicated in Fig. 4. The bolts used for this purpose pass through a ring 23 inside of the spokes of the automobile wheel, so that said spokes are securely clamped between the ring and the support 22. The ring 23 and the support 22 have formed through them a plurality of holes similarly placed so that the clamping bolts may be differently disposed therein for different makes and sizes of automobile wheels, to avoid the necessity for specially treating these parts to suit any particular make of wheel.

The channel bar 5 has secured thereto a bracing bar 24, as indicated in Figs. 1 and 5, the particular conformation of the bracing bar shown in Fig. 5 being for a purpose to be described. As shown in Fig. 2, longitudinal bracing members 25 are used to reinforce and strengthen that part of the tractor frame which carries the driving mechanism. The rear ends of the members 25 are connected by plates 26 with the transverse channel bar 7.

The longitudinal members 1 of the tractor frame have secured thereto two upwardly extending plates 27 adapted to engage the rear side of the rear automobile axle 30 when the automobile is in place in tractor frame. For this position a second pair of plates 28 engages the forward side of the rear axle of the automobile, the inclined edges of the plates 27 and 28 serving to form a seat for the axle which moves the axle into proper position longitudinally of the tractor-frame so that the pinions 21 carried by the rear wheels 4 properly mesh with the gears 20. The rear axle is held in this position by means of U shaped plates 29 extending around the top of the axle, the lower ends of such plates being secured to the plates 27 and 28 by means of suitable bolts as indicated.

The forward end of the tractor frame is secured to the front axle 31 of the automobile as follows:—

A clip bar 32 is secured by suitable bolts to each longitudinal member 1 in a position so that when the rear axle 30 of the automobile is properly secured to the tractor frame the forward upwardly extending end of the clip bar engages the rear side of the forward axle in such a manner as to prevent vertical displacement between the axle and the tractor frame. The axle 31 is held in this position by a pair of sliding clips 33, one of which is carried by each of the longitudinal members 1. Each clip 33 is provided at its rear end with an upward extension which engages the forward side of the front axle 31 to hold the axle securely in engagement with the corresponding clip 32, and thus the clips 32 and 33 coöperate to securely hold the front axle 31 to the forward end of the tractor frame. Each clip 33 has formed thereon a boss 34 which is threaded to receive a bolt 35. Each bolt 35 engages at its forward end a bracket 36 bolted to the corresponding longitudinal member 1. Motion of the bolt 35 forward in the bracket 36 is prevented by means of a nut or collar 37 secured to the bolt, and any particular adjustment given the sliding clip 33 by means of the bolt 35 may be maintained by a suitable locking nut 38.

Each longitudinal member 1 is provided with a plurality of holes 39 through its horizontal member, by which the clips 32 and 33 and the brackets 36 may be given such a position longitudinally of the members 1 as to engage the front axle of any desired make of automobile.

The channel bar 7 is provided with a plurality of holes 40 at regular intervals so that a draw-bar 41 may be secured to the channel bar 7 by means of suitable bolts in any position required to properly operate the mechanism to be drawn by the tractor. If desired, additional draw-bars, as shown at 42, may be employed so that different implements may be connected to the tractor at the same time, each having its individual connection with the channel bar 7 so that the particular requirements of its operation may be properly met.

In placing the automobile in position upon the tractor frame the hand wheels 14 are first rotated so as to lower the rear end of the tractor frame. Then the automobile is backed over the forward end of the tractor frame, care being taken to cause the rear wheels to pass over the transverse channel 5 at about the proper position. The inclined portions of the bracing bar 24 serve during this operation to shift the rear end of the automobile laterally, if the driver does not succeed in properly alining it. As a result, after passing the channel bar 5, the rear wheels are in such lateral alinement that the pinions 21 will properly engage the gears 20 when the automobile axle is brought into proper position upon the tractor-frame. This is accompanied by further motion backward of the automobile until the rear axle engages the upwardly extending plates 27. The forward end of the tractor frame is raised, the clips 32 are brought into proper engagement with the rear side of the axle 31, and the sliding clips 33 are moved backward by the bolts 35 to rigidly secure the axle 31 to the forward end of the tractor-frame. Then the hand-wheels 14 are rotated, raising the entire rear end of the automobile until the wheels 4 are sufficiently above the ground to clear any obstructions that the mechanism may be required to pass over.

As soon as the wheels 4 leave the ground the rear axle 30 of the automobile rests upon the plates 27 and 28 and the U shaped plates 29 are then fastened in place to hold the rear axle in position.

The tractor is then ready for use, and the various speeds obtainable by means of the change gearing of the automobile may be employed to drive the tractor at various speeds. But the mechanism is preferably designed so that the tractor will operate to advantage on the highest speed since this develops the greatest power of the automobile engine. The gear ratios of the tractor mechanism are preferably such that with the highest speed of the ordinary automobile the speed of the tractor will be about that required for ordinary farming operations such as plowing, cultivating, etc.

It is to be noted that since each tractor wheel is independently connected with a corresponding rear wheel of the automobile, that the differential mechanism of the automobile is available for the tractor device when the latter is required to turn curves. And further, that if it is required to reverse the direction of motion of the tractor the reversing mechanism of the automobile may be used to secure this result, and that special mechanism in connection with the tractor driving gearing is not required for this purpose.

While I have shown my invention in the particular embodiment herein described I do not, however, limit myself to this exact construction but may employ any substantial equivalent thereof without departing from the spirit of my invention.

What I claim is:

1. In an automobile tractor, a framework, a main axle carried by the frame-work, means for raising or lowering the frame-work relatively to the axle, driving wheels supporting the frame-work, gearing carried by the frame-work and connecting with the driving gears, and means carried by the frame-work for securing an automobile to the frame-work in connection with said gearing.

2. In an automobile tractor, the combination of a frame-work, driving wheels for supporting the rear end of the tractor, clamping devices for connecting the frame-work with the frame-work of an automobile, gearing for communicating the motion of the rear wheels of the automobile independently to the corresponding driving wheels of the tractor, and means for raising or lowering the rear end of the tractor frame.

3. In an automobile tractor, the combination of a frame-work, driving wheels for supporting the frame-work, devices carried by the frame-work for supporting the rear end of an automobile, a gear secured to each of the rear wheels of an automobile, gearing between said gears and the tractor driving wheels, and means carried by the tractor for raising the rear end of the automobile from the ground.

In witness whereof, I hereunto subscribe my name this 10th day of August, A. D. 1911.

WALTER H. ZIMMERMAN.

Witnesses:
ALBERT C. BELL,
ALBIN C. AHLBERG.

Copies of this patent may be obtained for five cents each, by addressing the "Commissioner of Patents, Washington, D. C."